US008226789B1

(12) United States Patent
Glaser

(10) Patent No.: US 8,226,789 B1
(45) Date of Patent: Jul. 24, 2012

(54) PROTECTIVE COVER FOR A GOLF CLUB AND METHOD OF APPLICATION

(76) Inventor: Andrew Glaser, New York, NY (US)

( * ) Notice: Subject to any disclaimer, the term of this patent is extended or adjusted under 35 U.S.C. 154(b) by 0 days.

(21) Appl. No.: 13/337,535

(22) Filed: Dec. 27, 2011

Related U.S. Application Data

(60) Provisional application No. 61/495,077, filed on Jun. 9, 2011.

(51) Int. Cl.
*B32B 37/02* (2006.01)
(52) U.S. Cl. ........... 156/212; 156/229; 156/84; 473/324
(58) Field of Classification Search .............. 156/84, 156/212, 229; 473/324
See application file for complete search history.

(56) References Cited

U.S. PATENT DOCUMENTS

| | | | |
|---|---|---|---|
| 7,914,638 B2 | 3/2011 | Van Den Berghe et al. | |
| 7,946,937 B2 | 5/2011 | Searle | |
| 2003/0148821 A1* | 8/2003 | Morgan et al. ............... | 473/324 |
| 2004/0206434 A1 | 10/2004 | Kingsbury | |
| 2008/0076593 A1* | 3/2008 | Costa et al. ................. | 473/316 |
| 2009/0124409 A1 | 5/2009 | Greeves | |
| 2009/0314398 A1* | 12/2009 | Shaar, Jr. ..................... | 150/160 |
| 2010/0292019 A1* | 11/2010 | Stites ........................... | 473/282 |

OTHER PUBLICATIONS

Print out of webpage www.ghosttape.com, Ghost Tape, Dec. 27, 2011.
Print out of webpage www.newedgesports.com, ClearShield, Dec. 27, 2011.
Print out of webpage www.proactivesports.silverw.com/scripts/silverware.exe/moreinfor@D/ELEVCLIENTS/proactivesports/elevator/..., ClearShield, Dec. 27, 2011.
Printout of webpage www.amazon.com/ProActive-DU001-Pop-Up-protector/dp/B001B6AQEW, Pop Up Protector, Dec. 27, 2011.

* cited by examiner

*Primary Examiner* — Khanh P Nguyen
*Assistant Examiner* — John Blades
(74) *Attorney, Agent, or Firm* — Porter, Wright, Morris & Arthur, LLP

(57) ABSTRACT

A protective cover for a golf club, such as a driver or wood, is disclosed that remains in place during play to prevent scuffing, scratching, and the like of the surface finish. The golf club includes a head having a striking face portion and a non-planar body portion, and a shaft extending from the head. The protective cover includes a one-piece continuous polymeric film that closely conforms to the shape of at least a portion of the non-planar body portion of the golf club head, such as the entire crown, and a layer of adhesive adhering the polymeric film to the club head. The polymeric film preferably does not cover the face portion of the golf club head so that it has minimal impact on the performance of the golf club. A method of applying the protective cover to the club head is also disclosed.

30 Claims, 10 Drawing Sheets

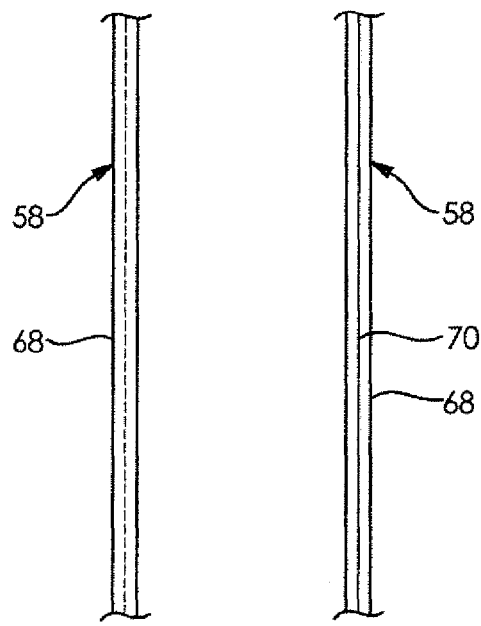
FIG. 6   FIG. 7
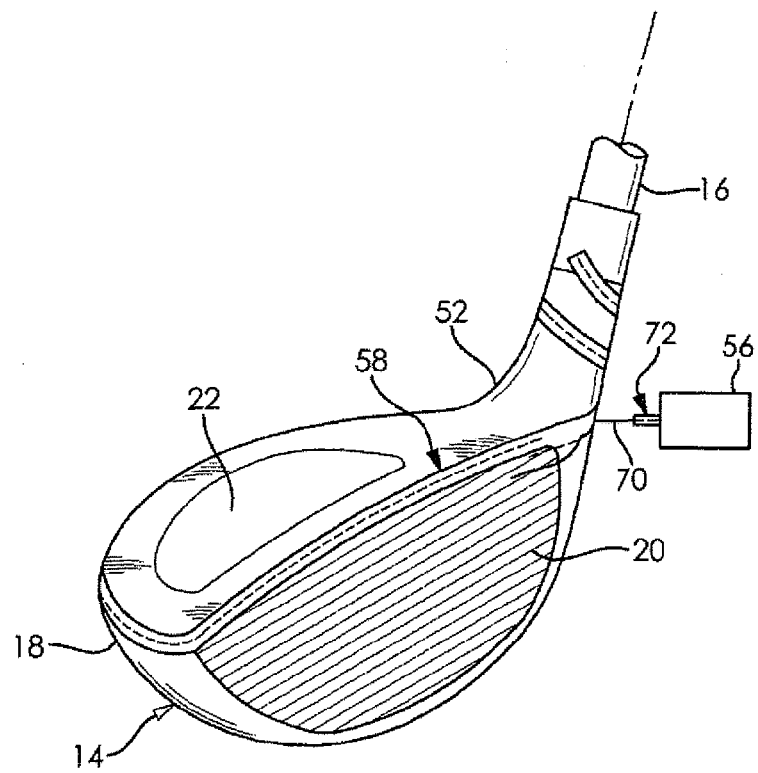
FIG. 8

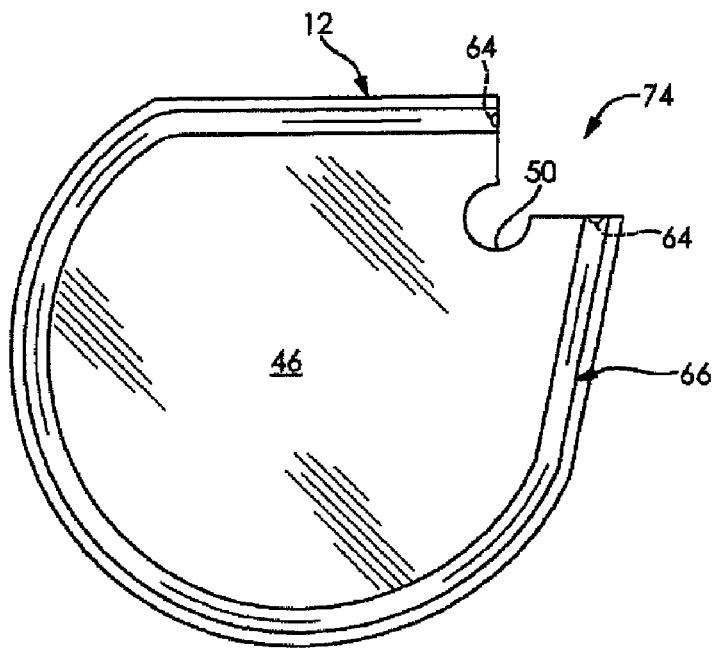
FIG. 11
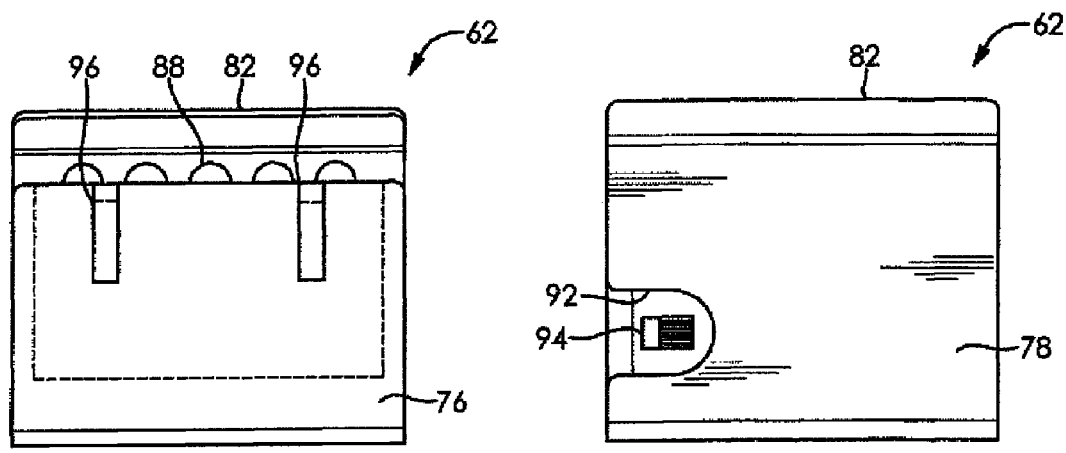
FIG. 12  FIG. 13

PROTECTIVE COVER FOR A GOLF CLUB AND METHOD OF APPLICATION

CROSS-REFERENCE TO RELATED APPLICATIONS

This application claims the priority benefit of U.S. provisional patent application No. 61/495,077 filed in Jun. 9, 2011, the disclosure of which is expressly incorporated herein in its entirety by reference.

STATEMENT REGARDING FEDERALLY SPONSORED RESEARCH

Not Applicable

PARTIES TO A JOINT RESEARCH AGREEMENT

Not Applicable

REFERENCE TO APPENDIX

Not Applicable

FIELD OF THE INVENTION

The field of the present invention generally relates to golf clubs, and more specifically, to protective covers for golf clubs that remain on the club head during play and their methods of application.

BACKGROUND OF THE INVENTION

Once manufactured, the outer surface finish on the heads of golf clubs, such as drivers, woods, rescue clubs, and the like, is not easily changed or refinished. The hard coating surface finish provided by manufacturers requires a specialist in coatings and refinishing regardless of whether it is desired to repair the original surface finish or provide a new decorative surface finish. This becomes a problem because the golf club heads have nothing to protect their surface finishes and they are often scratched, marred, and the like.

There are many types of protective covers that cover the golf club head and an upper portion of the base of the shaft when the club is not in use such as, for example, when the club is stored in a bag. These types of protective covers are essentially in the form of a sock that are placed over the head of the club and cannot be used while the club is being actively used. When these covers are removed, the surface finish of the club head can be scratched or otherwise marred to create an unsightly surface. This can occur when knocked against another club, when a ball contacts a surface other than the face, when the club is accidentally dropped, when the club is dropped or thrown in anger, or when anything else contacts a surface of the club other than the club face. As stated above, this is particularly a problem because it is difficult and expensive to refinish the club head surfaces once they have become scratched and otherwise marred.

There have also been several attempts to protect the surface finish of club heads damage during play. Ghost Tape (see ghosttape.com) is a clear flat tape that is temporarily placed over the entire club head, including the striking face, in separate pieces for protecting clubs on trial and is intended to be taken off once the club is purchased. The tape is somewhat stretchy but does not closely conform to the shape of the club head and does not conform to United States Golf Association (USGA) rules. Clear Shield (see newedgesports.com) is a clear flat strip of tape that is bent over the top edge of the striking face so that it partially covers the top of the club head and partially covers the striking face. This tape is visible as being a decal (regardless of what the manufacturer states in its advertising), does not closely conform to the club head, does not protect the entire crown of the club head, and does not conform to USGA rules. Pop Up Protectors (see proactivesports.com) is also a clear flat strip of tape but it is narrower than the Clear Shield and only covers a small portion of the top of the club head along the top edge of the striking face. The Pop-Up Protectors may conform to USGA rules but they still suffer from each of the other deficiencies of the Clear Shield.

Accordingly, there is a need for a system and method for protecting the surface finish of a golf club head during use that has the appearance of a professionally applied surface finish rather than that of a typical decal, closely conforms to the shape of the club head, protects the entire crown of the club head, and/or conforms to USGA rules.

SUMMARY OF THE INVENTION

Disclosed herein is a system and method for protecting the surface finish of golf clubs during use which overcomes at least one of the above-described deficiencies of the prior art. Disclosed is a method of applying a protective cover to a golf club having a head and a shaft extending from the head, said method comprising the steps of, in combination, obtaining a protective cover including a thin polymeric film for covering and closely conforming to the shape of at least a portion of the golf club head and a layer of adhesive for adhering the thin polymeric film to the golf club head and securing a tensioning device to the protective cover to tension the protective cover and starting to secure the protective cover to the golf club head while the tensioning device is secured to the protective cover. The steps also include securing the protective cover to the golf club head with the adhesive layer while applying heat to stretch the thin polymeric film and remove wrinkles so that the protective cover closely conforms to the golf club head and cutting off excess portions of the protective cover so that the protective cover covers a desired portion of the golf club head.

Also disclosed is a method of applying a protective cover to a golf club having a head and a shaft extending from the head, said method comprising the steps of, in combination, obtaining a protective cover including a thin polymeric film for covering and closely conforming to the shape of at least a portion of the golf club head and a layer of adhesive for adhering the thin polymeric film to the non-planar body portion of the golf club head, aligning the protective cover to the golf club head in a desired orientation relative to the golf club head using an alignment device, and securing a portion of the protective cover to the golf club head in the desired orientation relative to the golf club head. The steps also include further securing the protective cover to golf club head while applying heat to stretch the thin polymeric film and remove wrinkles so that the protective cover closely conforms to the golf club head and cutting off excess portions of the protective cover so that the protective cover covers a desired portion of the golf club head.

Also disclosed is a method of applying a protective cover to a golf club having a head and a shaft extending from the head, said method comprising the steps of, in combination, obtaining a protective cover including a thin polymeric film for covering and closely conforming to the shape of at least a portion of the golf club head and a layer of adhesive for adhering the thin polymeric film to the golf club head, and placing tape having a cutting filament thereon onto the golf club head where the protective cover is to be cut to remove excess portions. The steps also include securing the protective cover to the golf club head with the adhesive layer while applying heat to stretch the thin polymeric film and remove wrinkles so that the protective cover closely conforms to the golf club head and cutting off excess portions of the protective cover using the cutting filament so that the protective cover covers a desired portion of the golf club head.

Also disclosed is a method of applying a protective cover to a golf club having a head with a face portion for striking the ball and a non-planar body portion, and a shaft extending from the head, said method comprising the steps of, in combination, obtaining a protective cover including a thin polymeric film for covering and closely conforming to the shape of at least a portion of the non-planar body portion of the golf club head and a layer of adhesive for adhering the thin polymeric film to the non-planar body portion of the golf club head and placing tape having a cutting filament thereon onto the golf club head where the protective cover is to be cut to remove excess portions. The steps also include securing a tensioning device to the protective cover to tension the protective cover, and securing a portion of the protective cover to the golf club head in the desired orientation relative to the golf club head while the tensioning device is secured to the protective cover. The steps additionally include further securing the protective cover to the non-planar body portion while applying heat to stretch the thin polymeric film and remove wrinkles so that the protective cover closely conforms to the non-planar body portion of the golf club head, cutting off excess portions of the protective cover using the cutting filament so that the protective cover covers a desired portion of the body portion of the golf club head, and applying post heat to the protective cover to set the shape of the protective cover to closely conform to the non-planar body portion.

From the foregoing disclosure and the following more detailed description of various preferred embodiments it will be apparent to those skilled in the art that the present invention provides a significant advance in the technology and art of systems and methods for protecting the surface finish of golf club heads during use. Particularly significant in this regard is the potential the invention affords for providing a relatively inexpensive and easy to use protective cover for a golf club head. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein:

FIG. 6 is a front view of a section of tape with an embedded cutting filament for use while installing the protective cover of FIG. 5.

FIG. 7 is a rear view of the section of tape with an embedded cutting filament of FIG. 6.

FIG. 8 is a perspective view of the golf club of FIG. 1 with the tape of FIGS. 6 and 7 secured thereto along what is a possible desired cut line of the installed protective cover of FIG. 2.

FIG. 11 is a rear view of the protective cover of FIG. 5 but removed from the releasable backing sheet and having the tensioning device of FIGS. 9 and 10 secured thereto.

FIG. 12 is a front view of an alignment device which cooperates with an alignment aid on the protective cover of FIG. 5 for use while installing the protective cover of FIG. 5.

FIG. 13 is a rear view of the alignment device of FIG. 12.

It should be understood that the appended drawings are not necessarily to scale, presenting a somewhat simplified representation of various preferred features illustrative of the basic principles of the invention. The specific design features of the golf clubs and the protective covers as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the golf club heads and the protective covers illustrated in the drawings.

DETAILED DESCRIPTION OF CERTAIN PREFERRED EMBODIMENTS

It will be apparent to those skilled in the art, that is, to those who have knowledge or experience in this area of technology, that many uses and design variations are possible for the protective covers for golf club heads disclosed herein. The following detailed discussion of various alternative and preferred embodiments will illustrate the general principles of the invention with a driver but other embodiments and variations suitable for other applications will be apparent to those skilled in the art given the benefit of this disclosure.

Figure 1:
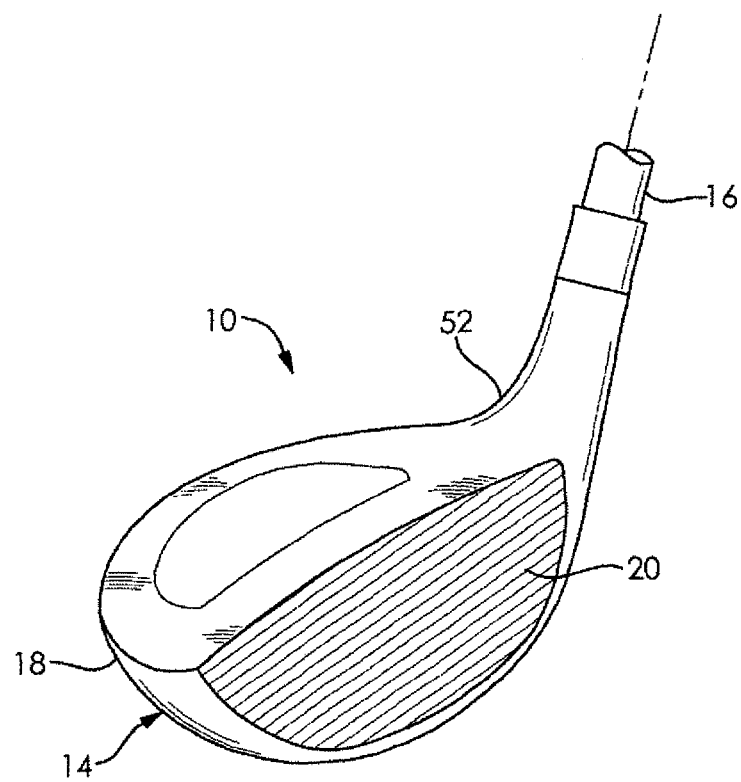
FIG. 1 is a perspective view of the head end of a golf club.

Referring now to the drawings, FIG. 1 illustrates a regulation golf club 10 suitable for installation of a protective cover 12 according to the present invention. It is noted that while the illustrated golf club 10 is a driver or wood, any other suitable type of golf club can be utilized with the protective cover 12 of the present invention. It is also noted that the illustrated driver is exemplary and the protective cover 12 of the present invention can be utilized with other forms of drivers. The illustrated golf club 10 has a bulbous-shaped head 14 and an elongate shaft 16 extending upwardly from the head 14. An upper end of the shaft 16 is provided with a hand grip to be held by the golfer using the golf club 10. The illustrated club head 14 includes a non-planar body portion or body 18 and a generally planar face portion or face 20 at one side of the body portion 18 for striking a golf ball. The top of the body portion 18 of the club head 14 forms a non-planar, typically convex, crown 22 which is what the golfer sees when addressing the golf ball just prior to striking the ball.

Figure 2:
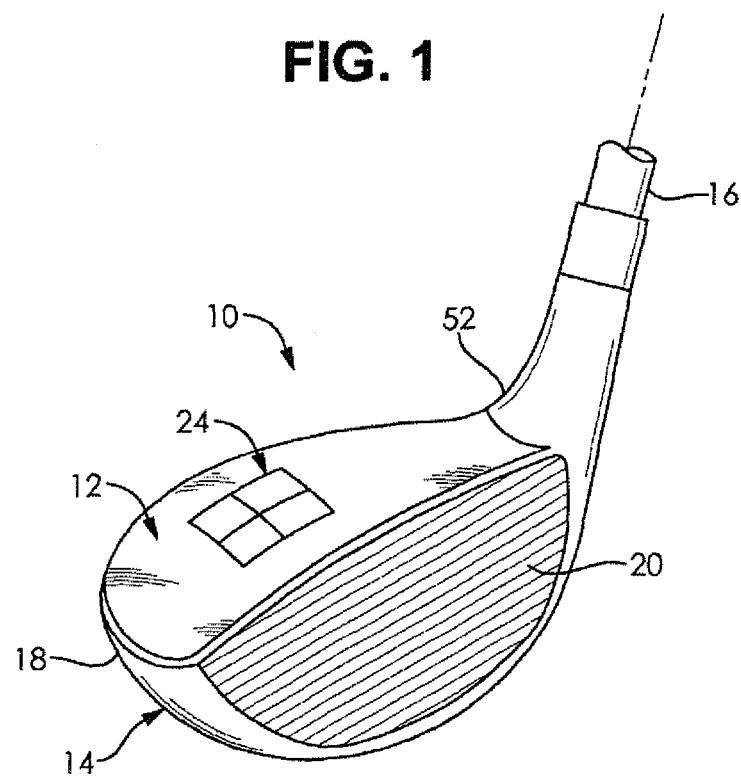
FIG. 2 is a perspective view of golf club head of FIG. 1 but with a protective cover according to the present invention secured thereto.

FIG. 2 illustrates the golf club 10 with the protective cover 12 according to the present invention secured thereto. The illustrated protective cover 12 covers only the crown 22 of the body portion 18 and covers the entire crown 22 of the body portion 18. It is noted that the protective cover 12 can alternatively cover other portions of the club 10 within the scope of the present invention such as, for example, the protective cover 12 could additionally wrap under the club head 14 as desired, cover less than the entire crown 22 of the golf club 10 as desired, and for partially cover the face 20 with an amount that would comply with USGA rules as desired. The illustrated protective cover 12 is lightweight and does not cover any portion of the face portion 20 so that the protective cover 12 does not substantially affect the performance characteristics of the golf club 10. The illustrated protective cover 12 protects the crown 22 of the club head 14 against scratching, marring, scuffing and the like of the original surface finish on the club head 14 and the protective cover 12 can be easily replaced if damaged or desired for other reasons such as, for example, the desire to change the graphics provided thereon. The illustrated protective cover 12 is also provided with printed indicia or graphics 24 thereon. The indicia 24 can be decorative indicia such as artwork, logos, or the like and/or functional indicia such as an alignment aid, practice aid, or the like. The illustrated indicia 24 is in the form of a four-square design which can be used as an alignment aid.

Figure 3:
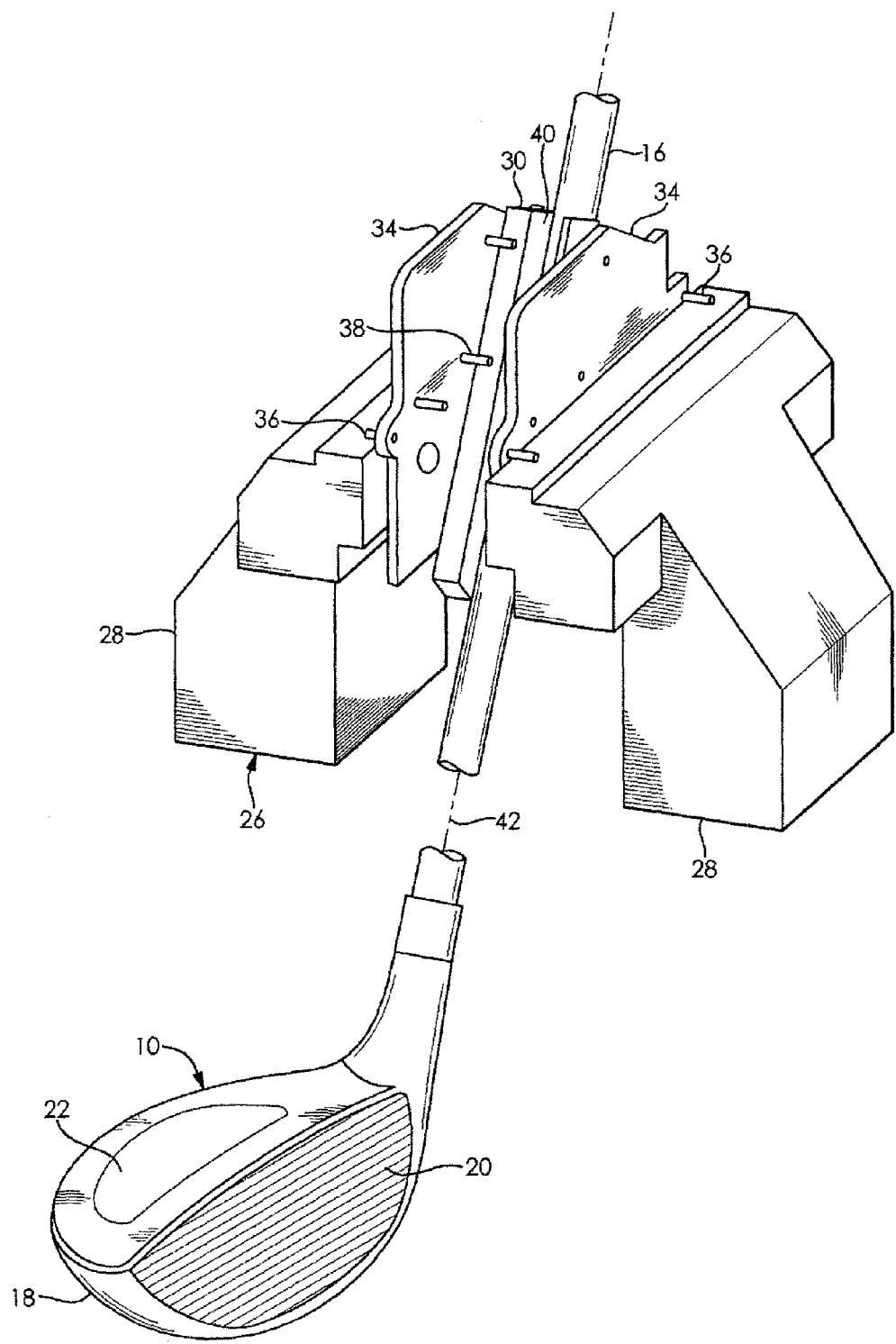
FIG. 3 is a perspective view of a vice having a shaft of the golf club of FIG. held therein for application of the protective cover to the golf club head.
Figure 4:
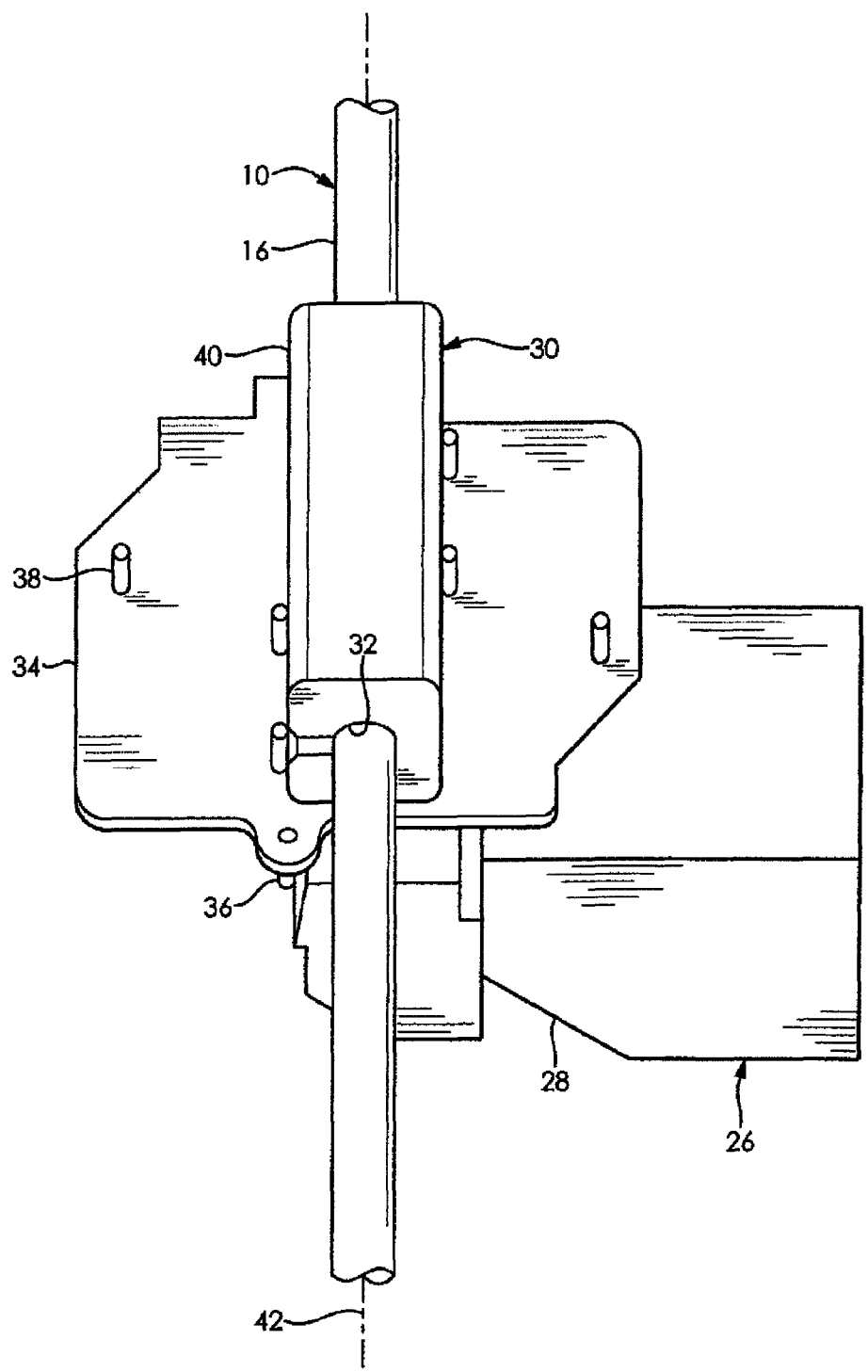
FIG. 4 is a perspective view of the vice of FIG. 3 but wherein components are removed for clarity and wherein an inner holding member of the vice holds the golf club in a substantially horizontal orientation rather than an inclined orientation as in FIG. 3.

FIGS. 3 and 4 illustrate a vice 26 for supporting the golf club 10 during installation of the protective cover 12 as described in more detail hereinafter. The illustrated vice 26 includes a pair of vice members 28 that can be selectively brought together and apart to hold the golf club 10 therebetween when brought together. The illustrated vice 26 also includes an inner holder or holding member 30 having a passage 32 that receives the shaft 16 of the golf club 10 and outer holders or holding members 34 that support the inner holding member 30. The outer holding members 34 have outwardly extending pins 36 which support the outer holding members 34 on and between the vice members 28 and inwardly extending pins 38 that support the inner holding member 30 between the inner holding members 30 in a desired orientation relative to the vice members 28. The outer holding members 34 preferably can selectively support the inner holding member 30 in at least two orientations relative to the vice members 28. The illustrated outer holding members 34 can support the inner holding member 30 in an inclined orientation of about 58 degrees relative to horizontal (best shown in FIG. 3) and a substantially horizontal orientation parallel to the ground (best shown in FIG. 4) but any other suitable orientations and/or quantity of orientations can alternatively be utilized. The illustrated inner holding member 30 has an open side or slot 40 for laterally passing the shaft 16 of the golf club 10 into the passage 32 when the inner holding member 30 is not gripped between the outer holding members 34 by the vice members 28. The inner holding member 30 is preferably formed of a resiliently deformable material such as rubber so that the inner holding member 30 can operate as a living hinge for insertion and removal of the club shaft 16 and so that the inner holding member 30 does not scratch or otherwise damage the club shaft 16 when held within the passage 32. The illustrated inner holding member 30 is sized and shaped so that the golf club 10 is supported and held in place but can be easily rotated about the central axis 42 of the club shaft 16 during installation of the protective cover 12 as described in more detail hereinafter. The type of rubber or other material used for the inner holding member 30 can be important in allowing this rotation. The rubber should be relatively hard such as the rubber used in the Clubmaker Rubber Vice Clamp available from Golfsmith International. Additionally or alternatively a piece of silk, felt or other low friction material can be placed in the inner holding member 30 to allow for easy rotation of the club shaft 16. It is noted that any other suitable vice or holding device 26 can alternatively be utilized such as the Pro Metal Vice Clamp available from Golfsmith International or The GolfWorks which can be modified by adding additional rubber pads or the like. The orientation of this vice within a larger vice like 26 can then be manually adjusted to an orientation of substantially parallel to the ground and approximately 58 degrees to the ground, or any other angle as desired.

Figure 5:
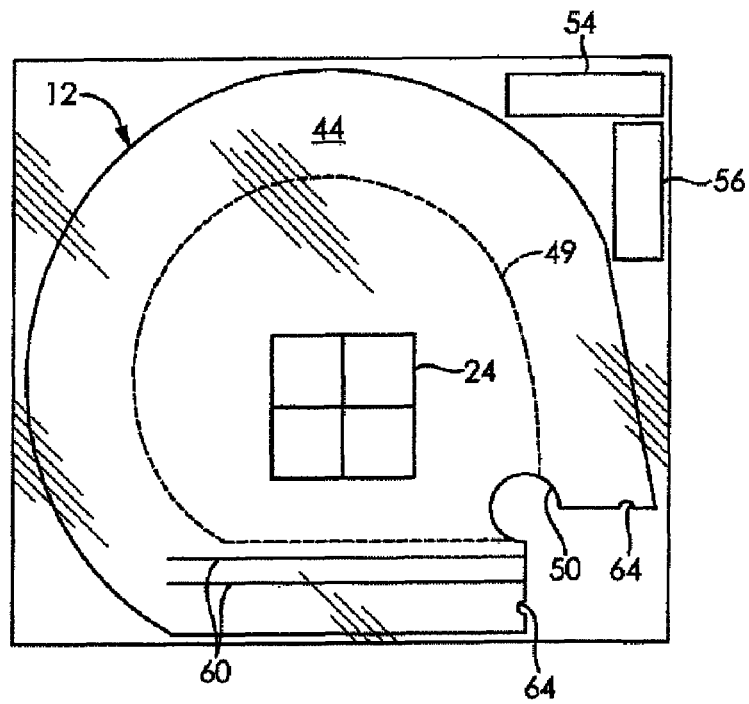
FIG. 5 is a front view of the protective cover of FIG. 2 but prior to installation and secured to a planar releasable backing sheet, wherein the approximate final cut line is shown in dashed line.
Figure 5A:
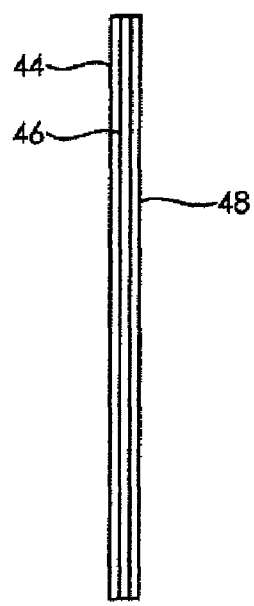
FIG. 5A is a side view of the protective cover of FIG. 5.
Figure 9:
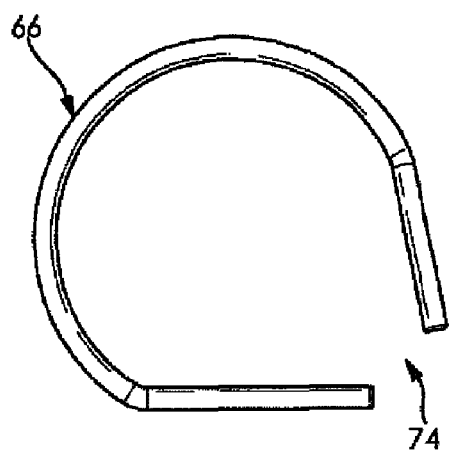
FIG. 9 is a plan view of a tensioning device for use while installing the protective cover of FIG. 5.
Figure 9B:
FIG. 9B is another side view of the tensioning device of FIGS. 9 and 9A.
Figure 9A:
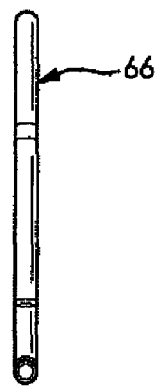
FIG. 9A is a side view of the tensioning device of FIG. 9.
Figure 10:
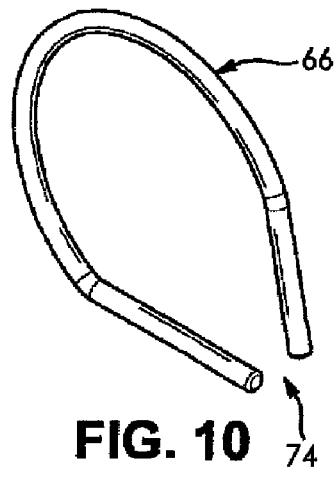
FIG. 10 is a perspective view of the tensioning device of FIGS. 9, 9A, and 9B.

FIGS. 5 and 5A illustrate an exemplary protective cover 12 as shipped and stored prior to installation. The illustrated protective cover 12 includes a flat, thin, single layer or multilayer polymeric film 44 and a thin layer of adhesive 46 on a rear side of the polymeric film 44 for securing the polymeric film 44 to the club head 14. The polymeric film 44 can comprise vinyl film or the like. It is noted that the polymeric film 44 can be selectively provided with or without filler material, with or without adhesives, with or without printable surfaces, with or without matrix colorant, and with or without laminate. The illustrated protective cover 12 is provided on a flat releasable backing sheet or release paper 48 protectively covering the layer of adhesive 46 during shipping, storage and handling prior to installation. It is noted that the backing sheet 48 can be eliminated if the layer of adhesive 46 is applied to the polymeric film 44 during installation. The illustrated protective cover 12 is precut to a size substantially larger than the club head crown 22 but can alternatively be cut to shape by the installer if desired. The protective cover 12 is preferably sized and shaped to cover at least a portion of the non-planar body portion 18 of the club head 14. The illustrated protective cover 12 is sized and shaped to cover the entire crown 22 of the club head 14 with the single or one-piece continuous polymeric film 44, but the protective cover 12 can alternatively be adapted to protect any other suitable portion of the club head body portion 18. The protective cover 12 is initially sized larger than its intended final installed size to provide extra material for holding, stretch, shrinking etc. This extra material is removed during the installation process as described hereinafter. The approximate installed size and shape of the protective cover is shown in dashed line 49. The illustrated protective cover 12 is generally tear drop shaped having a circular shaped portion and generally straight portions leading to a cutout 50 for partially encircling the base 52 of the club shaft 16. The term "cutout" is used herein and in the claims to mean an interruption in the outer periphery of the protective cover to avoid an interference with the base 52 of the shaft 16. The illustrated cutout 50 is generally round or circular being approximately ¾ of a circle but other suitable shapes such as, for example, oval parabolic, or the like can alternatively be utilized. Also attached to the illustrated backing sheet 48 are two strips 54, 56 comprising the same polymeric film and layer of adhesive 44, 46 as the protective cover 12. The first is a cover strip 54 which is placed at the starting intersection of tape with embedded filament (TEF) 58 and the polymeric film 44 for starting a clean cut with the TEF 58 in the protective cover during installation as described in more detail hereinafter. The second strip is a pull strip 56 which is folded over a free end of the of the TEF 58 for making a pull tab to make starting the TEF 58 as well as using the TEF 58 to cut the polymeric film 44 significantly easier during installation as described in more detail hereinafter.

The polymeric film 44 preferably has a thickness of about 3.5 mils or less such that it is stretchable and light weight. A suitable vinyl film 44 is, for example 3M Scotchprint Wrap Film Series 1080, available from 3M Corporation of St. Paul, Minn. For printed products, a suitable vinyl film 44 is, for example, Avery MPI 1005 Supercast Series with Avery UC DOL 1300 Series Clear Laminate each available from Avery Dennison of Painesville, Ohio. For this type of vinyl film 44, the indicia 24 and other markings are printed onto the vinyl film 44 using a latex ink, solvent based ink or other suitable ink and the vinyl film 44 is then laminated with a thin transparent over-laminate covering the printed outer surface of the vinyl film 44. The protective cover 12 can be clear/transparent, opaque having any desired color, translucent and having any suitable color, decorative with any suitable type of decorative pattern and/or decorative designs or indicia such as, for example, sporting team logos and the like. The illustrated protective cover 12 also is printed to have an alignment aid 60 to cooperate with an alignment tool or device 62 during installation as described in more detail hereinafter and with a position guide 64 to position a tensioning tool or device 66 during installation as described in more detail hereinafter. The illustrated alignment aid 60 is a straight line but can alternatively be circles, triangles, or other suitable shapes or can be openings or the like that cooperate with the alignment device 62 as discussed in more detail hereinafter. The illustrated straight line is positioned to be tangentially parallel to the middle of the club head face 20 (the "sweet spot") when the protective cover 12 is in the desired orientation relative to the club head 14 as described in more detail hereinafter. The illustrated position guide 64 for the tensioning device 66 is a pair of small semi-circular cutouts to position the tensioning device as described in more detail hereinafter. It is noted that the cutouts forming the position guide 64 can alternatively be formed of any other suitable shape and/or can be alternatively located along the desired path of the tensioning device 66 rather than at the edge. The position guide 64 can alternatively be any other suitable means for positioning the tensioning device 66 such as, for example, a centering line extending near the peripheral edge of the protective cover 12.

The illustrated layer of adhesive 46 comprises a relatively thin and relatively lightweight adhesive. The illustrated adhesive 46 is a pressure sensitive adhesive but can alternatively be any other suitable type of adhesive. The adhesive 46 preferably provides technology for minimizing bubbles and the like such as, for example Controltac available from 3M Corporation of St. Paul, Minn. The adhesive 46 preferably permits the installer of the protective cover 12 to easily correct mistakes by sticking, unsticking, and resticking the protective cover 12 to the club head 14.

FIGS. 6 and 7 illustrate the TEF or "knifeless tape" 58 that can be used to cut or trim the protective cover 12 at a desired location without the use of a knife as described in more detail hereinbelow. The illustrated TEF 58 includes a main web 68 with a pressure sensitive adhesive on a rear side and a cutting filament 70 embedded in the adhesive on the web 68. The illustrated cutting filament 70 is centrally located on the web 58 but it can alternatively be located anywhere along the width of the web 68. The cutting filament 70 is selected so that it will cut both the main web 68 of the TEF 58 and the polymeric film 44 of the protective cover 12. A suitable TEF 58 is produced by Knifeless Tech Systems of Coldstream, British Columbia, Canada.

To begin installation, the club head 14 is preferably cleaned with alcohol or another non-reactive substance that will rid the club head 14 of dirt, oils, etc. A cloth can be made damp with isopropyl alcohol and used to clean the club head 14 and then a dry cloth can be used to dry the club head 14. Next the TEF 58 is secured to the club head 14. Preferably, the TEF 58 is started off of the club head 14 so that there is a free or unstuck portion or "tail" 72 before the TEF 58 is secured to the club head 14. The illustrated tail 72 includes a portion which exposes the filament 70 and an unexposed portion for attachment of the pull tab 56 which is folded over the end of the tail 72. The unattached tail 72 makes it easier to start the cutting process than when the end of the TEF 58 is secured to a surface. The installer can chose to secure the pull strip 56 over the end of the TEF 58 before starting the TEF 58 as making the tail 72 is significantly easier and avoids "stripping" the cutting filament 70 rather than leaving the tail 72. FIG. 8 illustrates that the TEF 58 is secured on the club head 14 with the cutting filament 70 extending along the line where the desired edge of the protective cover 12 is desired. The TEF 58 is preferably adhered to the club head 14 while the shaft 16 is held in the vice 26 and can be easily rotated to wrap the TEF 58 around the club head 14. In the illustrated embodiment, the TEF 58 is wrapped entirely around the body portion 18 just above the club face 20 and/or at the bottom of the crown 22. It is noted that many club heads 14 have an edge or corner at the bottom of the crown 22 that delineates between the visible crown 22 and the underside of the club head 14. The TEF 58 can be put onto the club head 14 while the club 10 is in the vice 26 or not depending on the preference of the installer. If the installer chooses to put the club 10 in the vice 26 for this step, the club 10 should be horizontal or parallel to the floor. Typically the installer will start with the face 20 of the club 10 pointing skyward and place the point at which the cutting filament 70 just comes out of the TEF 58 at the shaft end of the face 20. The installer must anticipate approximately where the polymeric film 44 will begin and place the started cutting filament 70 just beyond this point so that the polymeric film 44 does not cover the started cutting filament 70 and so that there is room for the cover strip 54 to be appropriately applied (see below for appropriate location). The second end of the TEF 58 is preferably wrapped around the base 52 of the shaft 16 to provide a good anchor for preventing the TEF 58 from pulling off when the filament 70 is pulled as discussed in more detail hereinbelow. See U.S. Pat. No. 7,914,638, the disclosure of which is expressly incorporated herein in its entirety by reference, for a detailed description of using TEF 58 to cut film.

FIGS. 9, 9A, 9B, and 10 illustrate the tensioning device 66 used to tension the protective cover 12 during alignment to the club head 14. The illustrated tensioning device 66 is in the form of a ring having an opening at one end for insertion of the club shaft 16 into the ring. It is noted that the opening 74 can be eliminated if desired but this is less desirable because the club shaft 16 then must be extended length wise into the ring. The illustrated ring is shaped to match the peripheral shape of the protective cover 12. Thus the illustrated ring is generally tear drop shaped having a circular shaped portion and generally straight portions leading to the opening. The illustrated ring is formed by a metal rod having a circular cross section but the ring can be formed in any other suitable manner and shape. In the case where an adhesive is applied separately to the polymeric film 44 (and therefore there is not any adhesive on the polymeric film 44), a drum system can be used whereby the polymeric film 44 is wedged between two rings with one ring being slightly bigger than the other. It is noted that the shape of the tensioning device 66 can alternatively be square, oval, or any other suitable shape and the polymeric film 44 can be a totally different shape than the tension applicator 66 as long as long as the combination creates adequate and even tension in the polymeric film 44 (meaning the polymeric film 44 doesn't necessarily have to stick to every single spot of the tension applicator 66). The key is creating some tension for when the polymeric film 44 is heated and stretched (as described hereinafter), because even tension will result in fewer wrinkles and much less skilled work necessary in subsequent steps to make the polymeric film 44 closely conform to the shape of the club head 14 (without wrinkles and the like). In addition, tension also allows the alignment markings 60 on the polymeric film 44 to work properly in covert with the alignment device 62. A highly qualified vinyl expert may be able to accomplish this without the tensioning device 66 but it will take them longer (and with lower consistency) than an unskilled installer with the tensioning device 66.

To secure the illustrated tensioning device 66 to the protective cover 12, the polymeric film 44 is removed from the backing sheet 48 and placed down on a flat surface with the adhesive 46 facing up. Once the protective cover 12 is lying flat, the tensioning device 66 is placed on the rear side of the protective sheet 12 so that it is secured by the adhesive 46. Excess material of the polymeric film 44 can be wrapped around the outer curve of the tensioning device 66 to minimize chances of the protective cover 12 pulling off of the tensioning device 66 when pressure is applied in later steps. Secured in this manner the protective sheet 12 is maintained tensioned by the tensioning device 66. The illustrated tensioning device 66 is positioned on the protective cover 12 so that the ends of the ring are positioned at the semi-circle cutout 50 so that the ring extends along the periphery of the protective cover 12 with the opening 74 positioned at the cutout 50. FIG. 11 illustrates the tensioning device 66 secured to the back of the protective cover 12 and tensioning the protective cover 12.

Figure 14:
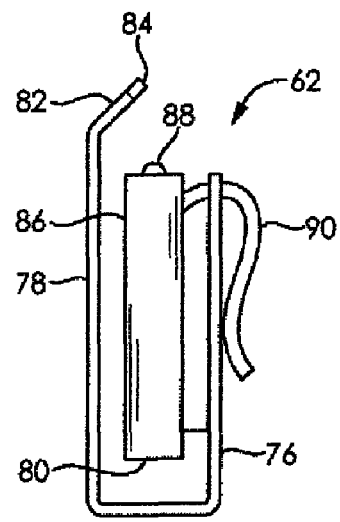
FIG. 14 is a side view of the alignment device of FIGS. 12 and 13.

FIGS. 12 to 14 illustrate the alignment device 62 for aligning the protective cover 12 to a desired orientation relative to the club head 14. It is noted that depending on the indicia 24 printed on the protective cover 12, it may not be necessary to align the protective cover 12. The illustrated alignment device 62 is generally channel shaped having spaced-apart front and rear walls 76, 78 connected at their lower end by a bottom wall 80. The top of the rear wall 78 is provided with an angled flange 82 forming a free edge 84 positioned to be aligned parallel to the illustrated alignment aid 60 on the protective cover 12. A light source 86 is provided below the flange 82 within the cavity between the front and rear walls 76, 78 and is directed upward toward the free edge 84 of the flange 82. The illustrated light source 86 is a battery-operated portable light with a plurality of LED lights 88 and clips 90 for attachment to a hat bill but it is noted that any other suitable light source 86 can alternatively be utilized. The illustrated light source 86 is a Master Vision Cap Light available from Import Merchandisers, Inc. The illustrated rear wall 78 is provided with an opening 92 that provides access to a power or on/off switch 94 of the light source 86. The illustrated front wall 76 is provided with a pair of spaced-apart notches 96 on its upper edge for receiving attachment clips 90 of the light source 86 to ensure that the light source 86 does not slide off of the front wall 76 when the light source 86 is clipped thereon. It is noted that the alignment device 62 can alternatively take any other suitable form. For example, the alignment device can have vertical rods or pins that extend through holes in the protective cover 12 to align the protective cover 12, a very bright light can be positioned under the club head 14, a laser can be positioned above or below the protective cover 12 that aligns with markings on the protective cover 12, the protective cover 12 can have openings that align with markings on the alignment device, the protective cover 12 can have a cutout shape that aligns with the actual shape of the alignment device, and the like. Also for example, the alignment device can have a unique mold of the bottom of each club head 14 with vertical rods or pins that cooperate with openings or the like in the protective cover (for example, like a four poster bed) to align the protective cover to the club head 14. The club head would then be raised to the protective cover or the protective cover would be lowered to the club head to precisely align the graphics 24 on the protective cover with the club head 14.

Figure 15:
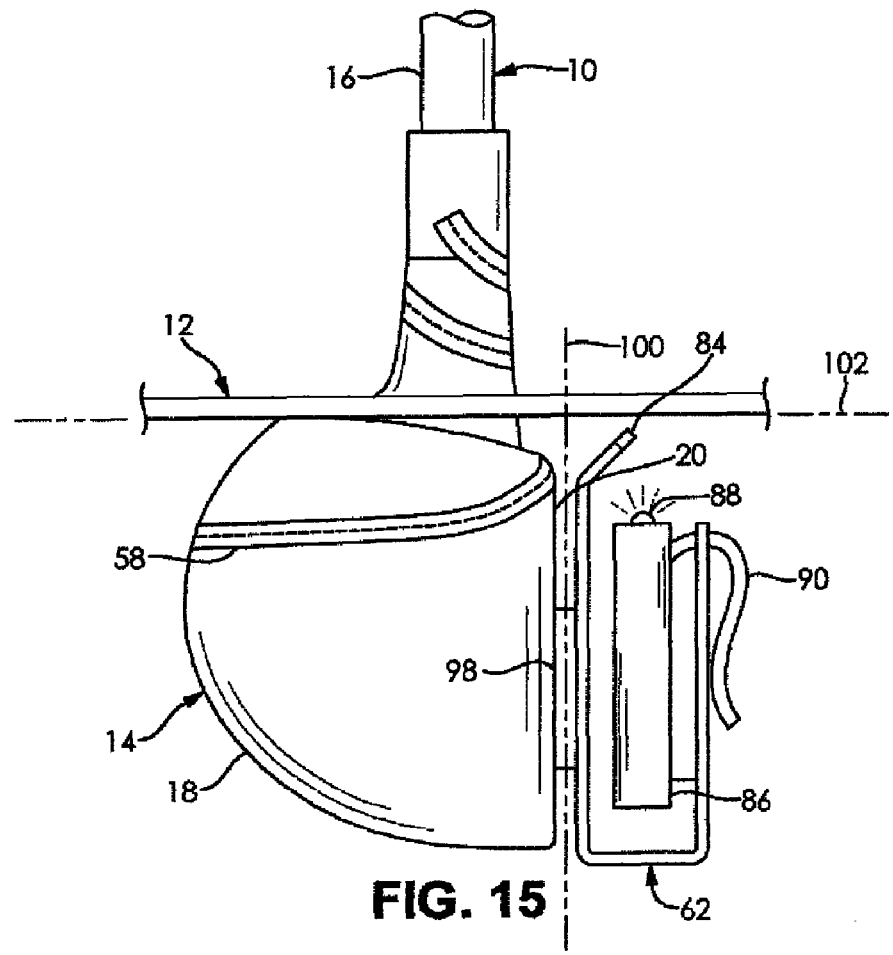
FIG. 15 is an elevational view of the golf club head of FIG. 8 with the alignment device of FIGS. 12 to 14 secured to a face thereof and the protective cover of FIG. 11 starting to be installed onto a crown thereof, but wherein the tensioning device of FIGS. 9, 10 and 11 is removed for clarity.

As best shown in FIG. 15, the illustrated alignment 62 is secured to the club head 14 with double-sided tape 98 for temporarily securing the alignment device 62 to the face 20 of the club head 14 for installation of the protective cover 12. First with the club 10 in the vice 26 (if preferred to be in the vice 26), with the club face 20 pointing skyward, two strips of the double-sided tape 98 are put equidistant from the center of the club face 20 so that a tangent line 100 of the club face 20 can be created. It is important to note that a suitable tangent line 100 is created to ensure graphics 24 on the polymeric film 44 are aligned as desired with the center of the club face 20 (the "sweet spot"). The alignment device 62 is pressed against the two strips of double-sided tape 98 with the top flange edge 84 of the alignment device 62 approximately at the same height as the highest point 102 of the top of the crown 22 of the club head 14. Said another way, the free edge 84 of the flange 82 of the alignment device 62 is also aligned so that it is approximately in plane (or parallel and slightly above the plane) with a tangent plane 102 at the same highest point of the top of the crown 22 of the club head 14. The process is generally relatively flexible and if the alignment device 62 is positioned slightly below or below this plane 102, the installer can still align successfully. The alignment device 62 will, however, be less effective if say one side of the alignment device 62 is well above the plane 102 and the opposite side is well below. With the alignment device 62 secured to the club head face 20, the club 10 is turned in the vice 26 to the angled position as shown in FIG. 3. Next, the protective cover 12 with the tensioning device 66 attached is positioned over the club head 14. The light source 86 back lights the alignment device edge 84 and the protective cover 12 so that the alignment aid 60 on the protective cover 12 can be aligned parallel with the edge 84 of the alignment device 62. The installer concurrently aligns the cutout 50 of the protective cover 12 with the club shaft 16. Typically the best backlight conditions are achieved when the protective cover 12 touches the top flange 82 of the alignment device 62. With both features of the protective cover 12 properly aligned, the protective cover 12 can be lowered onto the club head 14 until it just begins to stick on or near the highest part of the crown 22. Once satisfied with the alignment of the protective cover 12, the installer taps the protective cover 12 down in the middle of the crown 22 and in a circular motion increases the size of the stuck or adhered portion of the protective cover 12 until it is about the size of a silver dollar. The installer can then make an adhered line from the center of the crown 22 to the shaft 16 to ease later installation. The alignment device 62 can be removed at this point.

Figure 16:
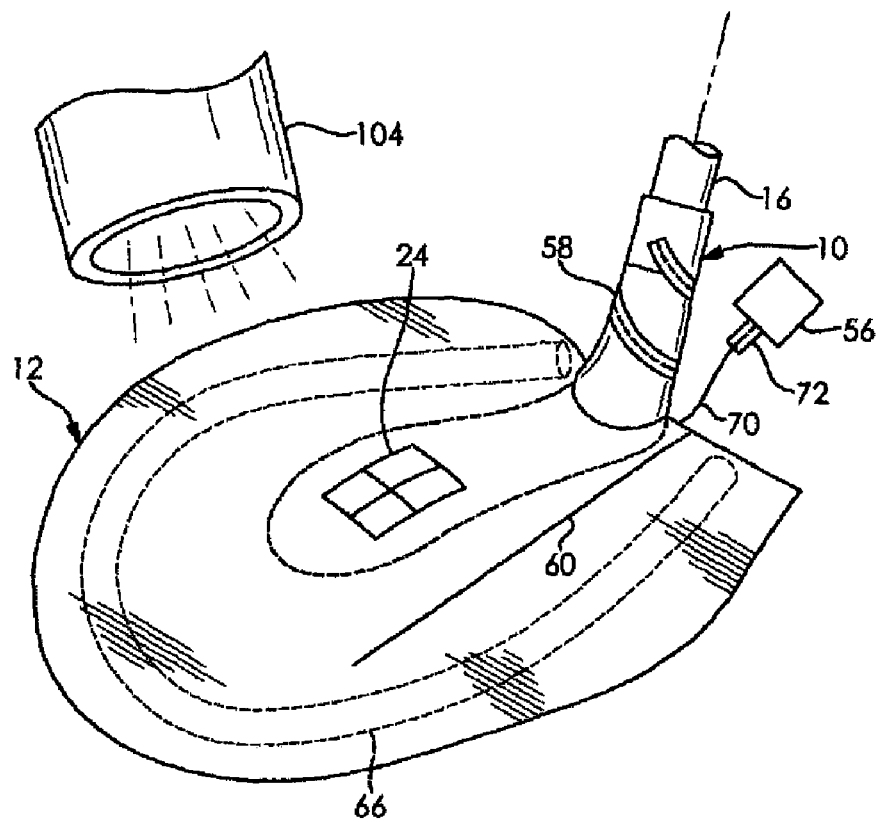
FIG. 16 is a perspective view of the golf club head of FIG. 15 with the protective cover aligned to the club head and a central portion of the protective cover secured to the club head, and wherein the alignment tool has been removed.

As best shown in FIG. 16, while holding the tensioning device 66, the installer uses a heat gun 104 on a low setting (typically about 500 degrees F.) to heat the protective cover 12 for about 5-10 seconds at a range of about 2 to 6 inches. Then with both hands on opposite sides of the tensioning device 66, the installer pushes down on the tensioning device 66 so that the protective cover 12 stretches to cover more of the club head 14. The installer should utilize known vinyl techniques to avoid creases and to get the polymeric film 44 to lay flat on the non-planar surface of the club head 14. Use of known vinyl techniques is especially necessary when covering extremely irregular shaped club heads 14 that have ridges or depressions. This requires the installers to actively use known vinyl techniques to press down certain areas. The use of cotton gloves can help some installers that have balmy hands and/or a heavy touch. The installer repeats this process until the crown 22 is covered to or nearly to the ring created by the TEF 58. Next the tensioning device 66 is removed from the protective cover 12. The protective cover 12 is then peeled back about ¼ inches to relieve tension if necessary. If the installer does not stretch the cover all of the way to the edge of the TEF 58, this peel back step may not be necessary but it will make the following steps more difficult as it will require higher levels of vinyl expertise to create a smooth service. Next, the installer uses the heat gun 104 on its low setting to heat the edges of the protective cover 12 to get them to regain their shape and relieve tension (the edges are the most stretched part of the protective cover 12 at this time). This highly stretched area has the most tension (meaning that if placed on a surface it might slowly want to regain its original form) and also the least amount of adhesive 46. In order to minimize the stretch and thinning of adhesive 46, the polymeric film's property of memory is used through the application of heat using the heat gun 104. The polymeric film 44 that is not adhered to the club head 14 will shrink, thickening the adhesive 46 and relieving tension.

Figure 17:
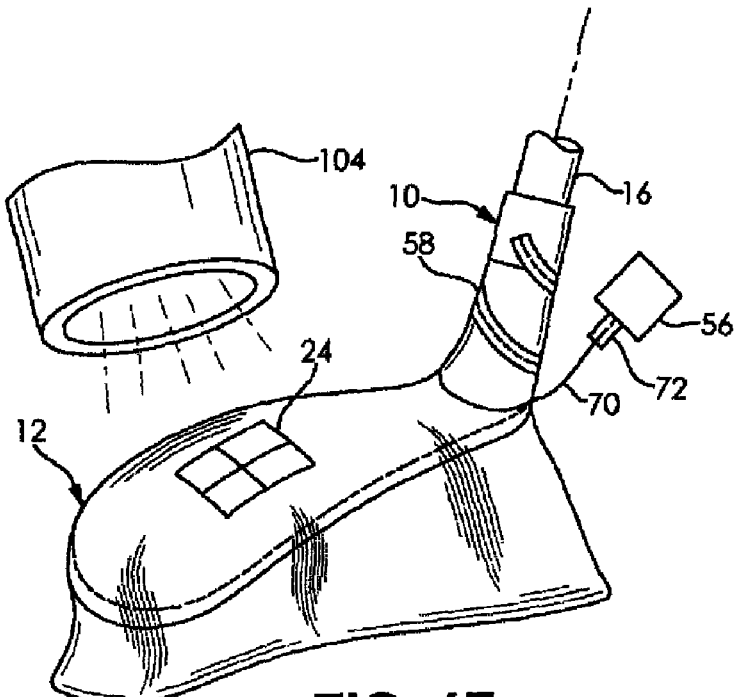
FIG. 17 is a perspective view of the golf club head of FIG. 16 with heat applied to the protective cover to remove folds, creases, wrinkles and the like and with the protective cover further secured to the non-planar surface of the club head past the tape with embedded filament.

As best shown in FIG. 17, with little to no additional heat the polymeric film 44 is smoothed over the TEF 58 so that the TEF 58 is completely covered by the polymeric film 44 with no wrinkles, ripples or the like all the way around the club head 14.

Figure 18:
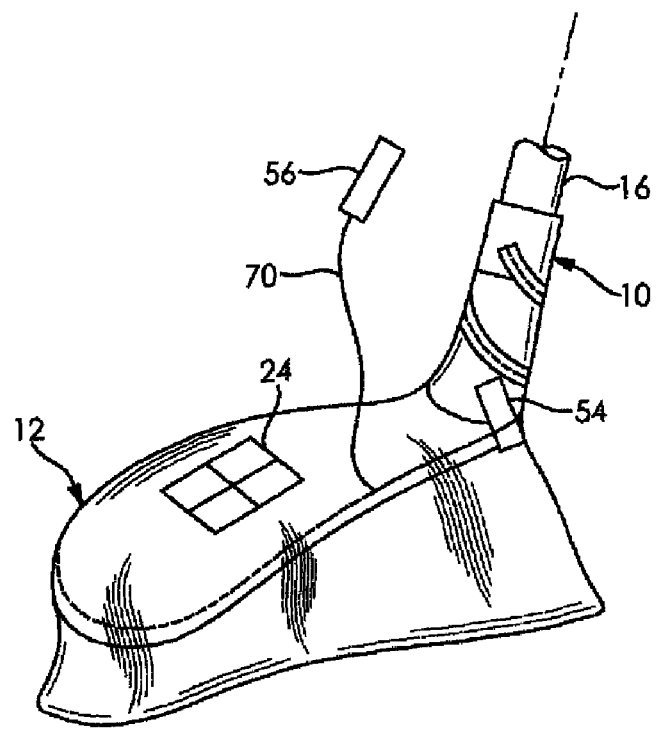
FIG. 18 is a perspective view of the golf club head of FIG. 17 with the filament of the tape being pulled to cut the protective cover and trim off undesired portions of the protective cover.

The club 10 is now put in the parallel to the floor position with the club face 20 pointing skyward. As best shown in FIG. 18, the cover strip 54 is removed from the backing sheet 48 and placed so that it covers a small portion of the protective cover 12 (approximately ¼ to ⅛ inch) and extends to approximately ⅛ of an inch from where the first bit of cutting filament 70 comes out of the TEF 58. This ensures that the first vinyl that is cut is the cover strip 54 rather than the protective cover 12 ensuring a clean first cut into the protective cover 12. The cover strip 54 should be perpendicular to the TEF 58 because the cutting filament 70 makes a cleaner cut into a perpendicular surface. The club 10 is now rotated around the shaft axis 42 so that the toe of the club 10 points skyward and the shaft 16 is still parallel to the ground. The installer should put a finger (or other object that can yield the same result) with a moderate amount of pressure over the extended cutting filament 70, the TEF 58, and a portion of the cover strip 54 with the cutting filament 70 held down in the direction it is intended to cut (so that the filament cuts rather than removes the TEF 58) and sharply tug the cutting filament 70 in the direction it is to be cut at an angle of about 0 to 40 degrees to the surface. If possible, the installer should not stop pulling the cutting filament 58 until it has cut the polymeric film 44 all the way around the club head 14. The club head 14 can be rotated with the non-pulling hand to aid in a non-stop cut. If the installer must stop in the middle of the cut, they should hold a finger on the TEF 58 as they did when starting at the beginning and give it a quick tug to start and continue pulling until all of the polymeric film 44 is cut. The excess film material cut from the adhered protective cover 12 can be peeled off and discarded along with the cover strip 54. It is noted that the protective cover 12 can alternatively be cut to size using any other suitable means such as, for example, a knife. For example, knife point can be calibrated carefully to only go down the thickness of the polymeric film 44. This technique can be used in conjunction with a mold that outlines the cut line (this mold would be needed for each club type). The special knife could then be run along the edge of the mold to create the cut line. It is also noted that the protective cover 12 can alternatively be provided with perforations or the like so that the extra material can be removed at the perforations to avoid cutting with a filament, knife, or the like. This alternative, however, would require the protective cover 12 to be sized and shaped for a specific club head 14 resulting in the need for many different versions of the protective cover 12. This method is also unlikely to yield a smooth edge.

Figure 19:
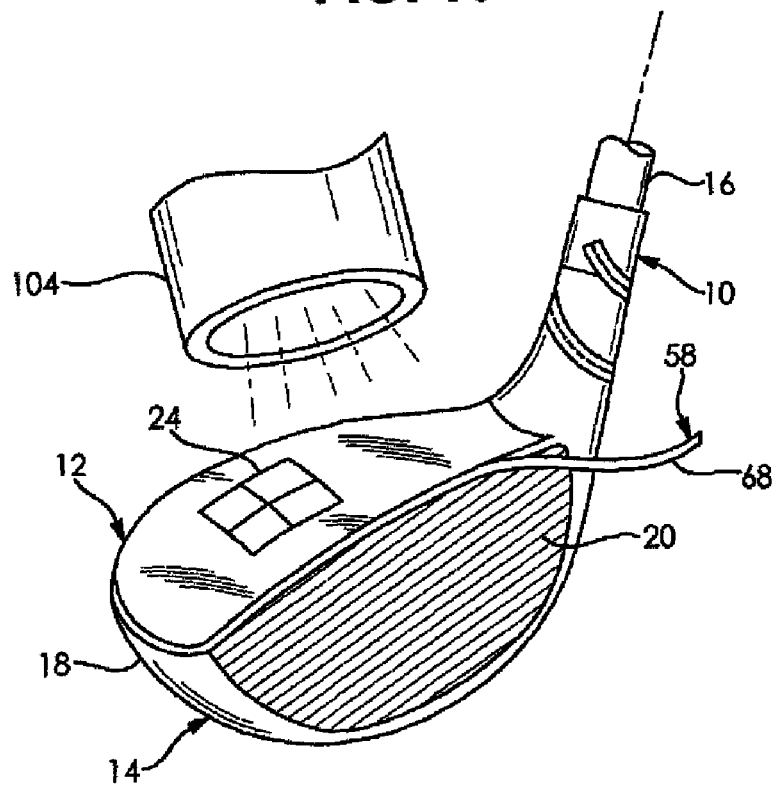
FIG. 19 is a perspective view of the golf club head of FIG. 18 with the remaining portion of the tape being removed from beneath the edge of the protective cover and heat being applied to the protective cover to set the final shape and secure the edges.

As best shown in FIG. 19, the residual portion of the TEF 58 under the edge of the adhered protective cover 12 must be removed. The residual portion of the TEF 58 is preferably removed by pulling down and back carefully. This technique minimizes ripples in the edges of the protective cover 12. It is noted that if an edge filament tape is used rather than a center filament tape, you can simply proceed to post heating as there is not any residual portion of the TEF 58 to remove. Using heat as necessary, the installer can smooth the edges of the protective cover 12 down using proper vinyl smoothing technique (pushing the ripples toward areas that have already fully adhered to the club head 14). Finally, the protective cover 12 is post heated to about 200 degrees F. taking care to emphasize the edges and areas around the neck or base 52. Post heating will minimize the memory of the material thereby minimizing tension. If desired, a coating such as clear nail polish can be applied along the edge of the polymeric film 44 to ensure that it remains flush with the club head 14 for an extended period of time. Installation of the protective cover 12 is then complete as best shown in FIG. 2. If it is desired to remove the protective cover 12, it can be simply peeled off (using heat if necessary) of the club head 14 without damage and if desired a new protective cover can be installed utilizing the above described procedure. If the clear nail polish was used, it may be necessary to use nail polish remover or the like to remove the residue.

It is noted that each of the features and variations of the above disclosed embodiments can be used in any combination with each of the other embodiments.

From the foregoing disclosure it is apparent that the above described protective covers 12 protect the surface finish of a golf club head 14 during use, have the appearance of professionally applied surface finishes rather than that of typical decals, closely conform to the shape of the club heads, protects the entire crowns 22 of the club heads 14 (if desired), and conform to USGA rules. Additionally the protective covers 12 provide decorative and/or functional indicia on the golf club head 14. Furthermore the protective covers 12 can be installed on new or nearly new golf clubs 10 for protection or can be installed on used golf clubs 10 for providing a new surface finish and/or further protection. Moreover the protective covers 12 can also be removed and replaced at any time.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A method of applying a protective cover to a golf club having a head and a shaft extending from the club head, said method comprising the steps of, in combination:
   obtaining a protective cover including a thin polymeric film for covering and closely conforming to the shape of at least a portion of the golf club head and a layer of adhesive for adhering the thin polymeric film to the golf club head;
   securing a tensioning device to the protective cover to tension at least a portion of the protective cover and starting to secure the protective cover to the golf club head while the tensioning device is secured to the protective cover;
   wherein the tensioning device includes an opening for the shaft of the golf club;
   securing the protective cover to the golf club head with the adhesive layer while stretching the thin polymeric film to remove wrinkles so that the protective cover closely conforms to the golf club head;
   removing the tensioning device from the protective cover after the protective cover is at least partly secured to the golf club head; and
   cutting off excess portions of the protective cover so that the protective cover covers a desired portion of the golf club head.

2. The method according to claim 1, wherein the thin polymeric film comprises vinyl film.

3. The method according to claim 1, wherein the desired portion is an entire crown of the golf club head.

4. The method according to claim 1, wherein the tension device is comprises a ring that extends along a peripheral edge of the protective cover when secured thereto.

5. The method according to claim 4, wherein the ring includes en the opening therein for insertion of the shaft of the golf club therethrough.

6. The method according to claim 1, wherein the tensioning device is secured to the layer of adhesive of the protective cover.

7. The method according to claim 1, further comprising the step of placing the shaft in a vice which permits the shaft to rotate about a central axis of the shaft and permits the shaft to be selectively positioned in a first position that is substantially horizontal and a second position that is inclined relative to horizontal so that a crown of the golf club head can face up.

8. The method according to claim 1, further comprising the step of placing tape having a cutting filament thereon on the golf club head and wherein the step of cutting off excess portions of the protective cover includes cutting the protective cover with the filament.

9. The method according to claim 1, further comprising the steps of aligning the protective cover to the golf club head in a desired orientation relative to the golf club head using a rigid alignment device temporarily secured to the golf club, wherein an alignment aid on the protective cover is aligned with the alignment device to align the protective cover in the desired orientation relative to the golf club head, and removing the alignment device from the golf club after at least a portion of the protective cover is secured to the golf club head in the desired orientation relative to the golf club head.

10. The method according to claim 9, wherein the alignment aid is printed on the protective cover.

11. A method of applying a protective cover to a golf club having a head and a shaft extending from the head, said method comprising the steps of, in combination:
   obtaining a protective cover including a thin polymeric film for covering and closely conforming to the shape of at least a portion of the golf club head and a layer of adhesive for adhering the thin polymeric film to the non-planar body portion of the golf club head;
   temporarily securing a rigid alignment device to the golf club;
   aligning the protective cover to the golf club head in a desired orientation relative to the golf club head using the alignment device temporarily secured to the golf club, wherein an alignment aid on the protective cover is aligned with the alignment device to align the protective cover in the desired orientation relative to the golf club head;
   securing at least a portion of the protective cover to the golf club head in the desired orientation relative to the golf club head while the alignment device is secured to the golf club;
   removing the alignment device from the golf club after at least a portion of the protective cover is secured to the golf club head in the desired orientation relative to the golf club head;
   further securing the protective cover to golf club head while stretching the thin polymeric film and to remove wrinkles so that the protective cover closely conforms to the golf club head; and
   cutting off excess portions of the protective cover so that the protective cover covers a desired portion of the golf club head.

12. The method according to claim 11, wherein the thin polymeric film comprises vinyl film.

13. The method according to claim 11, wherein the desired portion is an entire crown of the golf club head.

14. The method according to claim 11, wherein the alignment device is temporarily secured to a striking face of the golf club head.

15. The method according to claim 11, wherein the alignment device is secured to a striking face of the golf club head with at least one piece of double back tape to create a tangent to the striking face.

16. The method according to claim 11, wherein the alignment device includes a light located below the protective cover for backlighting the protective cover during alignment to create a shadow of a portion of the alignment device visible through the protective cover which is used to align the protective cover with the golf club head in a desired orientation.

17. The method according to claim 11, wherein the alignment device comprises a light source located below the protective cover which is visible through the protective cover to align the protective cover with the golf club head in a desired orientation.

18. The method according to claim 11, further comprising the steps of securing a tensioning device to the protective cover to tension at least a portion of the protective cover prior to the step of securing a portion of the protective cover to the golf club head in the desired orientation relative to the golf club head while the alignment device is secured to the golf club, wherein the alignment aid is located on the tensioned portion of the protective cover; and removing the tensioning device from the protective cover after the protective cover is at least partly secured to the golf club head.

19. The method according to claim 11, wherein the alignment aid is printed on the protective cover.

20. The method according to claim 11, further comprising the step of placing the shaft in a vice which permits the shaft to rotate about a central axis of the shaft and permits the shaft to be selectively positioned in a first position that is substantially horizontal and a second position that is inclined relative to horizontal so that a crown of the golf club head can face up.

21. The method according to claim 11, further comprising the step of placing tape with a cutting filament thereon on the golf club head and wherein the step of cutting off excess portions of the protective cover includes cutting the protective cover with the cutting filament.

22. A method of applying a protective cover to a golf club having a head and a shaft extending from the head, said method comprising the steps of, in combination:
   obtaining a protective cover including a thin polymeric film for covering and closely conforming to the shape of at least a portion of the golf club head and a layer of adhesive for adhering the thin polymeric film to the golf club head;
   backlighting the protective cover with a light source located behind the protective cover;
   aligning the protective cover to the golf club head in a desired orientation relative to the golf club head while the protective cover is backlit by using light transmitted through the protective cover to align the protective cover relative to the golf club in the desired orientation;
   securing at least a portion of the protective cover to the golf club head in the desired orientation while the protective cover is backlit by the light source;
   further securing the protective cover to the golf club head with the adhesive layer while stretching the thin polymeric film to remove wrinkles so that the protective cover closely conforms to the golf club head; and
   cutting off excess portions of the protective cover using the cutting filament so that the protective cover covers a desired portion of the golf club head.

23. The method according to claim 22, wherein the thin polymeric film comprises vinyl film.

24. The method according to claim 22, wherein the desired portion is an entire crown of the golf club head.

25. The method according to claim 22, wherein the light source creates a shadow of at least a portion of a rigid alignment device visible through the protective cover which is used to align the protective cover with the golf club head in the desired orientation.

26. The method according to claim 25, wherein the alignment device forms a tangent to a club face of the golf club head to which the protective cover is aligned.

27. The method according to claim 22, further comprising the step of placing the shaft in a vice which permits the shaft to rotate about a central axis of the shaft and permits the shaft to be selectively positioned in a first position that is substantially horizontal and a second position that is inclined relative to horizontal so that a crown of the golf club head can face up.

28. The method according to claim 22, further comprising the steps of securing a tensioning device to the protective cover to tension at least a portion of the protective cover prior to the step of securing the protective cover to the golf club head, wherein the step of securing the protective cover to the golf club head is started by securing at least part of the tensioned portion of the protective cover, and removing the tensioning device from the protective cover after the protective cover is at least partly secured to the golf club head.

29. A method of applying a protective cover to a golf club having a head with a face portion for striking the ball and a non-planar body portion, and a shaft extending from the head, said method comprising the steps of, in combination:
   obtaining a protective cover including a thin polymeric film for covering and closely conforming to the shape of at least a portion of the non-planar body portion of the golf club head and a layer of adhesive for adhering the thin polymeric film to the non-planar body portion of the golf club head;
   placing tape having a cutting filament thereon onto the golf club head where the protective cover is to be cut to remove excess portions;
   securing a tensioning device comprising a ring to the protective cover to encircle and tension at least a portion of the protective cover located within the ring;
   wherein the ring includes an opening therein for insertion of the shaft of the golf club therethrough;
   securing at least part of the tensioned portion of the protective cover to the golf club head in a desired orientation relative to the golf club head while the tensioning device is secured to the protective cover;
   further securing the protective cover to the non-planar body portion while stretching the thin polymeric film to remove wrinkles so that the protective cover closely conforms to the non-planar body portion of the golf club head;
   removing the tensioning device from the protective cover after the protective cover is at least partly secured to the golf club head; and
   cutting off excess portions of the protective cover using the cutting filament so that the protective cover covers a desired portion of the body portion of the golf club head.

30. The method according to claim 29, wherein the thin polymeric film comprises vinyl film.

* * * * *